Patented Oct. 31, 1950

2,528,469

UNITED STATES PATENT OFFICE 2,528,469

GRANULAR POLYMERIZATION OF VINYL CHLORIDE

Fred E. Condo, El Cerrito, and Carl W. Schroeder, Berkeley, Calif., assignors to Shell Development Company, San Francisco, Calif., a corporation of Delaware No Drawing. Application February 24, 1948, Serial No. 10,583

5 Claims. (Cl. 260—92.8)

This invention relates to an improved method for effecting granular polymerization of vinyl chloride in an aqueous medium.

At an early date, it was discovered that vinyl chloride could be polymerized by exposure to the action of light. It was shown later by Klatte and Rollett in U. S. 1,241,738 that polyvinyl chloride was formed upon heating vinyl chloride in the presence of a peroxide catalyst using either the vinyl chloride alone or a solution of vinyl chloride in an organic solvent. With the advent of polymerization of isoprene in aqueous emulsion, Plauson (U. S. 2,127,135) applied this method to polymerization of vinyl esters. In the method, the vinyl ester along with a polymerization catalyst is heated and agitated in admixture with considerable water containing an emulsifying agent. This emulsion method enables excellent control of the polymerization to be realized so that the resulting polyvinyl chloride has desirable physical properties. However, the polyvinyl chloride is obtained as an aqueous emulsion resembling latex, and in order to separate the polymer from the aqueous medium, it is necessary to subject the emulsion to a coagulation procedure, which at best, is difficult and rather costly. Crawford disclosed in U. S. 2,194,354 that vinyl esters can be polymerized in an aqueous medium without formation of emulsified polymer or latex by effecting the polymerization with the vinyl ester in admixture with water containing a small amount of a stabilizing colloid such as glycol cellulose or gelatine instead of an emulsifying agent, and by controlling the degree of agitation. In this method, the agitation of the mixture disperses the vinyl ester into tiny globules which are surrounded by the aqueous medium, and as polymerization of the globules of vinyl ester proceeds, the small polymer particles are prevented from agglomerating into substantially larger masses or a cake, as would otherwise happen, by the presence of the stabilizing colloid contained in the aqueous medium. In this method of granular polymerization, the necessity for coagulation is obviated because, upon cessation of agitation, the polymer precipitates in the aqueous medium as tiny granules or pearls and the polymer particles can be separated from the aqueous medium by simple filtration or centrifugation.

Both the emulsion method of Plauson and the granular method of Crawford enable production of polymer in a finely divided or substantially powdered form which makes it directly useful for milling and molding operations into articles of commerce. Although it would seem that application of either method to polymerization of vinyl chloride should give a perfect form of polyvinyl chloride for commercial use, such is not the case. One desirable use for polyvinyl chloride is the manufacture of transparent films. Such films are prepared by mixing the finely divided particles of polyvinyl chloride with a plasticizer and rolling the composition into thin sheets. However, the polyvinyl chloride produced by either of these prior methods gives transparent plasticized sheets having present certain imperfections which are known technically as "fish-eyes." Fish-eyes are small globular masses of polymer in the transparent plasticized sheet that have failed to blend with the surrounding material. They give somewhat the appearance of a fish's eye. As to their nature, attention is directed to A. S. T. M. designation D675–43T.

The presence of fish-eyes in polyvinyl chloride film is most undesirable because, for obvious reasons, it prevents application of the film to all uses where transparency of the plastic is necessary. Moreover, fish-eyes represent heterogeneity in the plasticized polyvinyl chloride which causes the physical properties to be inferior, particularly the tear resistance. Fish-eyes also reduce the dielectric strength so that the composition is subject to a lower break-down voltage. In addition, fish-eyes are responsible for undesirable rough surfaces on sheets and extruded shapes of the plasticized polymer. When vinyl chloride is polymerized according to the method of Plauson wherein an emulsifying agent is present in the aqueous medium, the obtained polyvinyl chloride gives a plasticized sheet which contains large numbers of fish-eyes. The presence of the fish-eyes in the plasticized polymer is due to some inherent property of certain polyvinyl chloride particles in the emulsion polymer which do not blend into the remainder of the mass so as to give a homogeneous composition. In like manner, the granular polyvinyl chloride obtained by polymerization in an aqueous medium containing a stabilizing colloid according to the method of Crawford also produces polymer that gives a plasticized sheet containing many fish-eyes.

Quite unexpectedly, we have now discovered that a granular form of polyvinyl chloride not subject to the imperfection of giving plasticized sheets containing fish-eyes, at least in appreciable number, may be obtained by polymerizing vinyl chloride in an aqueous medium containing in combination both a water-soluble synthetic emulsifying agent and a water-soluble stabilizing hydrophilic colloid. It was surprising to find that although use of either the emulsifier alone, or the stabilizing colloid alone, produced polyvinyl chloride subject to formation of numerous fish-eyes, the use in combination of both the emulsifier and the stabilizing colloid gave polyvinyl chloride in granular form which upon being plasticized produced a composition which is substantially free, and in most cases is entirely devoid of fish-eyes. However, in order to secure this granular polyvinyl chloride capable of complete homogeneity with plasticizer, it is necessary not only to polymerize with combined use of a water-soluble synthetic emulsifying agent and the water-soluble stabilizer, but also to effect the polymerization in an aqueous medium within certain restricted ranges of concentration. These concentration ranges will be explained later, and for the moment, it is of interest to observe the different results obtainable by the method of the present invention using in combination a water-soluble synthetic emulsifying agent and a water-soluble stabilizing hydrophilic colloid for comparison with results obtained by using only a single one of these agents alone.

The dependence of the presence or absence of fish-eyes upon the different methods of polymerizing vinyl chloride is illustrated by the results given in Table I below. All of the polymerizations were effected in hermetically sealed pressure tubes devoid of oxygen or air which were tumbled in a heated water bath in order to obtain agitation and temperature control. In each case, the tubes at the start contained the aqueous phase and vinyl chloride liquefied under pressure with the total liquid contents being such that a small vapor space was present to enable good agitation of the tube contents by tumbling in the bath. In each example, there was present 400% of water based on the weight of liquid vinyl chloride with the exception of Example 1 wherein 300% of water was used. In Example 1 which demonstrates use of the emulsion method, a familiar water-soluble catalyst was employed, namely, 0.75% of ammonium persulfate, the catalyst percentage being based upon the weight of vinyl chloride. In all other cases, 1% of lauroyl peroxide was used. The particular emulsifier and/or stabilizing colloid together with its percentage concentration based on amount of water present is indicated in the table. Upon completion of the noted times for each example, the polyvinyl chloride was recovered from the aqueous reaction medium by filtration, with the exception of Example 1 which required coagulation and filtration. The polyvinyl chloride was then washed until free of foreign contaminants from the reaction medium, and dried. The last column of the table gives the number of fish-eyes contained in a cubic centimeter of the plasticized polymer. This determination was made as follows:

A mixture of 100 parts by weight of the polyvinyl chloride, 50 parts of dioctyl phthalate as plasticizer, and 2 parts of glycerol monooleate as stabilizer was milled on a roll mill heated at 140° C. for 5 minutes. This composition was then formed into a sheet 0.075 inch thick by pressing at 160° C. for 2 minutes in a flash mold using 1000 pounds per square inch pressure. Fish-eyes, if present, are plainly discernible with the naked eye. By counting the number of fish-eyes contained in a given area of the sheet of known thickness, simple calculation enabled the number contained in a cubic centimeter to be determined. The accuracy was made more certain by taking an average of counts from at least three areas on the sheet.

*Table I*

| Example No. | Emulsifier | Stabilizing Colloid | Temp., °C. | Time, hours | Per Cent Conversion | Form of polymer | Fish-eyes per cc. |
|---|---|---|---|---|---|---|---|
| 1 | 0.033% sodium salt of dioctyl sulfosuccinate. | None | 40 | 14 | 84 | Emulsified | 450 |
| 2 | None | 0.025% cellulose methyl ether. | 45 | 20 | 70 | Fine granules | 200 |
| 3 | 0.025% sodium salt of dioctyl sulfosuccinate. | do | 50 | 15.75 | 95 | Very fine granules | None |
| 4 | None | 0.5% gelatine | 40 | 24 | 80 | do | 350 |
| 5 | 0.061% sodium salt of dioctyl sulfosuccinate. | do | 40 | 24 | 90 | do | None |

As shown by Example 1 in the above table, use of a water-soluble synthetic emulsifying agent alone gives polyvinyl chloride having the property of giving plasticized compositions containing many fish-eyes. Examples 2 and 4 show that granular polymerization using a water-soluble stabilizing hydrophilic colloid alone such as cellulose methyl ether or gelatine also forms the polyvinyl chloride in a condition which gives numerous fish-eyes in the plasticized polymer. On the other hand, by effecting the polymerization with use in combination of the water-soluble synthetic emulsifying agent and the water-soluble stabilizing hydrophilic colloid, a new granular polyvinyl chloride is obtained which has the property of giving plasticized compositions which are usually entirely free of fish-eyes. Although the polyvinyl chloride produced by the process is not usually subject to having any fish-eyes present in the plasticized sheets thereof, at times a few fish-eyes may be present for reasons not entirely understood. Nevertheless, the plasticized sheet is substantially free of fish-eyes and by substantially free is meant that it contains not more than about 10 or 20 fish-eyes per cubic centimeter, which number has no appreciable effect on the properties and is only barely discernible by inspection, in comparison to the plasticized polymer containing 200 to 1000 or more fish-eyes per cc.

The polymerization of vinyl chloride in an aqueous medium is extremely complex owing to the numerous possible variables and this is especially true where, as in the process of the present invention, use is made of both the emulsifier and the stabilizing colloid. We discovered that the process is workable only by employing certain restricted ranges of concentration for the various components of the reaction mixture. The limits of these ranges, upon which depends workability of the process, tend to have interlocking effects and the use of all is essential. By employing the combination of restricted ranges to be described hereinafter, the process of the invention has proved to be highly efficient for commercial production of the improved form of granular polyvinyl chloride which does not give fish-eyes when plasticized.

The process of the invention comprises agitating and polymerizing dispersed liquid vinyl chloride in an aqueous medium at a temperature of 30° C. to 60° C., the reaction mixture containing 0.1% to 3% of an oil-soluble peroxide polymerization catalyst and 200% to 500% of water, each percentage being based on the weight of the vinyl chloride, as well as 0.01% to 0.09% of water-soluble synthetic emulsifying agent and 0.01% to 0.3% of water-soluble stabilizing hydrophilic colloid, which percentages are based on the weight of the water. The limits of some of these ranges are more sharply marked than others and this is in part due to peculiarities of vinyl chloride.

The lower limit of the temperature range is governed by the fact that at below 30° C., the rate of polymerization becomes too slow to be of practical value. At temperatures above 60° C. the resulting polyvinyl chloride is of such poor quality, especially with respect to molecular weight, that it has little value for manufacturing useful articles therefrom. Preferably, we operate at a temperature of 40° C. to 50° C., and particularly good results are obtained at 45° C. to 50° C., inclusive. The best results are obtained by maintaining the polymerizing mixture as nearly as possible at a chosen temperature within the indicated range throughout the polymerization. Use of a single temperature gives polyvinyl chloride of most uniform quality. When executing the process in batch-wise manner, it will of course be necessary to heat the reaction mixture to the desired reaction temperature. However, since the polymerization reaction of vinyl chloride is highly exothermic, it may be necessary to cool the reaction mixture, rather than heat it, after the reaction is under way.

The range of concentration for the peroxide catalyst is not too sharply limited and may be varied considerably although at too low a concentration as below about 0.1%, the rate of polymerization becomes unreasonably slow. At concentrations appreciably above 3%, the polymer is subject to burning when milled, which is undesirable. Good results are obtained at about .02% to 1%, which is a preferred range, and use of about .03% to 0.5% especially with lauroyl peroxide, is particularly suitable. These concentrations of catalyst are based on the weight of vinyl chloride since the process of the invention employs an oil-soluble catalyst which is soluble in the monomeric vinyl chloride in order to effect granular polymerization. The oil-soluble peroxide used in the process has a solubility of at least 5% by weight in liquid vinyl chloride at the operating temperature for the polymerization. These peroxides may thus also be termed vinyl chloride-soluble peroxide polymerization catalysts. Although lauroyl peroxide is a preferred catalyst, other oil-soluble peroxides may be used if desired such as acetyl peroxide, stearoyl peroxide, benzoyl peroxide, acetylbenzoyl peroxide, tertiary butyl perbenzoate, 2,4-dichlorobenzoyl peroxide, etc.

When polymerized in an aqueous medium, vinyl chloride is unlike other polymerizable compounds such as, for example, vinyl acetate or methyl methacrylate, in that a relatively large proportion of water is required to be present in order that the process of polymerization of vinyl chloride will be operative. We have found that with the reaction mixture of the present process containing the many components, the use of too low a concentration of water, i. e., appreciably below 200% water, gives a reaction mixture of granular polyvinyl chloride resembling moist sand. This is because the granular polyvinyl chloride has a marked tendency to absorb water from the reaction mixture. Any technical-scale commercial production of polyvinyl chloride is effected with polymerization being conducted in an autoclave fitted with a mechanical stirrer to provide the necessary agitation. It is apparent that if so little water is used in the reaction mixture that the polymerizing vinyl chloride acquires the consistency of moist sand, the needed stirring of the reaction mixture becomes impossible. The reaction mixture must at least remain as a fluid slurry. Moreover, if too little water is used, there is actual clumping of the polymer into cakes. We have found that the use of at least 200% water (based on the weight of vinyl chloride) is necessary in order that the reaction mixture containing the granular polyvinyl chloride will have the needed fluidity owing to the very appreciable absorption of water by the polymer. We therefore use 200% to 500% of water in the process of our invention. A more preferred range is from 225% to 300% and particularly good results are obtained with about 250% water.

The effect of varying the water concentration will be evident from the results given below in Table II. The experiments were effected in tumbling sealed tubes since with the lower concentrations of water, the reaction mixture took on the consistency of a stiff slurry or was like moist sand which was impossible to agitate with a mechanical stirrer in a customary reaction vessel. Examples 6 to 11 constitute one set of experiments wherein the effect of decreasing amounts of water are shown. In each case, the polymerization was effected at 50° C. for 24 hours using 0.3% lauroyl peroxide, 0.1% sodium salt of dioctyl sulfosuccinate and 0.15% cellulose methyl ether, all based on the weight of vinyl chloride. Examples 12 to 16 constitute another series of experiments wherein the polymerization was conducted at 50° C. for 15¾ hours using 1% lauroyl peroxide, 0.05% sodium salt of dioctyl sulfosuccinate and 0.1% cellulose methyl ether, each being based on the weight of vinyl chloride. The extent of conversion to polyvinyl chloride has been listed for each example to show that the polymerization was substantially complete at the end of the allotted time.

*Table II*

| Example No. | Water, Per Cent | Conversion, Per Cent | Condition of Reaction Mixture at End of Polymerization | | |
|---|---|---|---|---|---|
| | | | Fluidity | Ability of Particles to Settle | Tendency to Cake |
| 6 | 250 | 95 | Free flowing | Rapid | None. |
| 7 | 200 | 92 | do | do | Do. |
| 8 | 150 | 94 | Stiff slurry | None (semi-liquid) | Do. |
| 9 | 140 | 90 | do | do | Do. |
| 10 | 100 | 88 | Like moist sand | None (no liquid) | Loose clumping. |
| 11 | 75 | 94 | Like slightly moist sand | do | Clumping. |
| 12 | 500 | 92 | Free flowing | Rapid | None. |
| 13 | 400 | 93 | do | do | Do. |
| 14 | 300 | 78 | do | do | Do. |
| 15 | 200 | 90 | do | do | Do. |
| 16 | 100 | 95 | Like moist sand | None (dry) | Some clumping. |

The foregoing table shows that use of substantially less than 200% water gives a final reaction mixture containing too little liquid to permit settling of the formed granular polyvinyl chloride (see Examples 8 to 11 and 16). Such stiff slurries or mixtures like moist sand are incapable of being stirred and result from the water being absorbed into the polymer particles.

Even if the concentrations of emulsifier and stabilizing colloid are increased considerably, as is not possible in the process of the present invention for reasons which will appear later, the polymerization using vinyl chloride is either unworkable because of the acquired consistency of the reaction mixture or is unreasonably slow as is evident from the results given in Table III. Example 17 employed 1% lauroyl peroxide as catalyst and there was used 0.1% benzoyl peroxide in Example 18.

will be more apparent from the results given in Table IV which shows polymerization with all other variables held constant except the concentration of emulsifier. In each example, there was used 250% of water and 0.3% of lauroyl peroxide based on the weight of vinyl chloride along with 0.06% of methyl ether of cellulose as stabilizing colloid based on the weight of water. The emulsifier, which was varied in concentration, was the sodium salt of dioctyl sulfosuccinate. The polymerizations were effected by tumbling sealed tubes containing the reaction mixtures in a water bath at the noted temperature and time. At the end of the polymerization period, the tubes were allowed to cool and were opened whereupon the minor amount of unpolymerized vinyl chloride was permitted to gas out. The contents of the tubes were then filtered through extremely rapid, high wet-strength, very thin filter paper

Table III

| Example No. | Per Cent Based on Water | | Per Cent Water Based on Vinyl Chloride | Conversion to Polymer in 24 Hrs. at 50° C. | Condition of Reaction Mixture | | |
|---|---|---|---|---|---|---|---|
| | Sodium Salt of Dioctyl Sulfosuccinate | Cellulose Methyl Ether | | | Fluidity | Ability of Particles to settle | Filtrability (after dilution with 5 vols. of water) |
| | | | | *Per cent* | | | |
| 17 | 0.1 | 0.4 | 100 | 85 | Like moist sand | None (nonliquid) | Slow. |
| 18 | 0.228 | 1.14 | 78 | 8 | | | |

The concentration of the emulsifier is very important in the process of the invention and has (S and S No. 410) with observation being made of the rapidity.

Table IV

| Example No. | Emulsifier, Per Cent Based on Water | Conversion to Polymer in 24 hrs. at 50° C | Filterability of Polymer Mixture | Uniformity of Particle Size | Size of Particles |
|---|---|---|---|---|---|
| | | *Per cent* | | | |
| 19 | 0.004 | 88 | Rapid | Varied, some caking. | Very coarse. |
| 20 | 0.04 | 95 | Very rapid | Uniform | Very fine. |
| 21 | 0.08 | 94 | Rapid | do | Fine. |
| 22 | 0.1 | 92 | Slow | do | Do. |
| 23 | 0.2 | 80 | Very slow | Some coarse | Medium. | a pronounced effect upon the results if used outside the afore-mentioned limits. One reason for effecting the polymerization of vinyl chloride in an aqueous medium so that a granular form of polymer is obtained, is because the reaction mixture at the end of the polymerization can have the granular particles of polymer filtered therefrom directly without the necessity of first coagulating a latex of the polymer. We discovered that not only is there an increasing tendency to form latex at an emulsifier concentration of greater than 0.09% when the stabilizing colloid is also employed, but that the rate of filtration becomes so slow that the advantage of granular polymerization over latex polymerization is lost. Another result from using too great a concentration of emulsifier is that the granules of polyvinyl chloride become increasingly varied in size instead of being uniform and very fine as is the case when a range of 0.01% to 0.09% emulsifier is employed. This loss of uniformity of particle size is also encountered at concentrations appreciably below 0.01%. Furthermore, at such lower concentrations, there is also encountered caking of the polymer particles in spite of the presence of the stabilizing colloid. Preferably, a concentration of about 0.04% emulsifier is employed in the process.

These effects of the emulsifier concentration

The results given in the foregoing table demonstrate the marked difference in results with seemingly small variation in the concentration of emulsifier. At too low a concentration illustrated by Example 19, the rate of filtration is rapid, but the granules of polymer are coarse and not uniform in size. Furthermore, some caking of particles into lumps was encountered. At too high a concentration of emulsifier illustrated by Examples 22 and 23, the uniformity and particle size did not break so sharply from those of Example 21 wherein 0.08% emulsifier was employed, but there was a sharp departure in rapidity of filtration. It was surprising to discover that the small change of from 0.08% to 0.1% emulsifier would so adversely affect the filterability. After the experiments were made, it was realized that these results were at least in part due to the fact that at concentrations above 0.09% emulsifier, latex or emulsified polymer is formed and this latex probably clogs the pores of the filter so as to reduce the rate of filtration. Another peculiar and unexpected result was the variation in percentage conversion to polymer with variation in concentration of emulsifier. It is not understood why the rate of polymerization should be faster at an emulsifier concentration of 0.04% and 0.08% than at 0.004% or 0.1% and higher.

Variation in the concentration of the stabilizing colloid is not quite so sharply marked as to permissible limits as is the case with the emulsifier, but nevertheless, it must be kept at from 0.01% to 0.3% based on the amount of water present in the reaction mixture. A concentration of about 0.06% is particularly suitable. At too low concentrations, the polymer particles lose their uniformity as well as becoming coarse in size. At concentrations appreciably above 0.3%, the aqueous suspension medium becomes viscous and the polymer particles are no longer able to settle rapidly upon cessation of agitation. Moreover, at such higher concentrations of the stabilizing colloid, the aqueous suspension of polymer becomes increasingly more difficult to filter.

The results obtained at different concentrations of the stabilizing colloid are shown in Table V. In each example, there was used 250% of water and 0.3% of lauroyl peroxide based on the weight of vinyl chloride along with 0.04% of the sodium salt of dioctyl sulfosuccinate based on the weight of water. The stabilizing colloid, which was used in different concentration in each example, was the methyl ether of cellulose. This was the same type as used in all the examples given hereinbefore, and it gives a 2% aqueous solution having a viscosity of about 1500 centipoises at 20° C. The polymerizations were effected again in the same manner by tumbling sealed tubes containing the reaction mixture in a water bath at the noted temperature for the indicated time.

In executing the process of the invention, there may be used various water-soluble stabilizing hydrophilic colloids and various oil-in-water water-soluble synthetic emulsifying agents. Some substances are somewhat more efficient than others for the purpose intended, but by employing concentrations within the aforementioned limits, the desired results of an easily filterable, rapid settling suspension of granular polyvinyl chloride is achieved. Instead of employing only one substance respectively as the stabilizing colloid or as the emulsifier, there may be used two or more for each of these purposes provided the total concentration is kept within the limiting range.

Illustrations of the use of various stabilizing colloids and emulsifiers are shown in Table VI. Vinyl chloride was polymerized in each example by tumbling sealed tubes containing the reaction mixture in a water bath. There was used 250% of water based on the weight of vinyl chloride. In the table, the indicated percentage of stabilizing colloid and emulsifier is based on the weight of water present while the percentage of catalyst is based on the weight of vinyl chloride.

*Table VI*

| Example No. | Emulsifier | Stabilizing Colloid | Per Cent Lauroyl Peroxide | Hrs. at 50° C. | Conv. Per Cent | Product Form |
|---|---|---|---|---|---|---|
| 29 | 0.04% sorbitan monolaurate | 0.08% methyl cellulose 1500 [1] | 0.5 | 16.6 | 94 | Fine size granules. |
| 30 | 0.08% sorbitan monolaurate | 0.08% methyl cellulose 1500 | 0.5 | 15.5 | 92 | Do. |
| 31 | 0.04% polyethylene glycol of sorbitan monolaurate. | 0.04% methyl cellulose 1500 | 0.5 | 16.5 | 88 | Do. |
| 32 | 0.08% polyethylene glycol of sorbitan monolaurate. | 0.08% methyl cellulose 1500 | 0.5 | 16.6 | 86 | Do. |
| 33 | 0.02% sorbitan monostearate and 0.012% polyethylene glycol of sorbitan monostearate. | 0.16% methyl cellulose 1500 | 0.3 | 22.3 | 90 | Do. |
| 34 | 0.08% cetyl dimethyl benzyl ammonium chloride. | 0.08% methyl cellulose 1500 | 0.3 | 21 | 96 | Very fine granules. |
| 35 | 0.08% lauroyl pyridinium chloride | do | 0.3 | 21 | 94 | Do. |
| 36 | 0.04% polyglycol ether of dodecylphenol | do | 0.5 | 16.6 | 86 | Varied size granules. |
| 37 | 0.08% polyethylene glycol ether of iso-octylphenol. | do | 0.3 | 21.5 | 84 | Larger size granules. |
| 38 | 0.03% sodium salt of dioctyl sulfosuccinate. | 0.04% sodium cellulose glycollate. | 0.3 | 19 | | Varied size granules. |
| 39 | 0.4% sodium salt of dioctyl sulfosuccinate | 0.06% sodium cellulose glycollate. | 0.3 | 21.5 | 92 | Very fine granules. |
| 40 | do | 0.06% glycol cellulose | 0.3 | 20.5 | | Varied size granules. |
| 41 | do | 0.08% ether of ungelatinized starch. | 0.3 | 21 | 94 | Medium size granules. |
| 42 [2] | 0.013% sodium salt of dioctyl sulfosuccinate. | 0.06% methyl cellulose 50 [3] | 1 | 22 | 85 | Very fine granules. |
| 43 | 0.08% polyethylene glycol ether of sorbitan monooleate. | 0.08% methyl cellulose 1500 | 0.3 | 20.5 | 88 | Medium size granules. |
| 44 | 0.08% pentaerythritol monooleate | do | 0.3 | 18 | 88 | Varied size granules. |

[1] Cellulose methyl ether giving aqueous solution of 1500 centipoises viscosity at 20° C. with 2% concentration.
[2] Used 400% water and temperature of 45° C.
[3] Cellulose methyl ether giving aqueous solution of 50 centipoises viscosity at 20° C. with 2% concentration.

The methyl ether of cellulose is a particularly preferred stabilizing colloid for use in the process of the invention. This substance may have the cellulose methylated to various extents. Good results are obtained with methyl cellulose which gives a 2% aqueous solution having a viscosity of

*Table V*

| Example No. | Stabilizing Colloid, Per Cent Based on Water | Conversion to Polymer in 24 hrs. at 50° C. | Fluidity of Polymer Suspension | Ability of Suspension to Settle Polymer Particles | Size of Particles |
|---|---|---|---|---|---|
| | | Per cent | | | |
| 24 | 0.008 | 80 | Free flowing | Rapid | Coarse and variable. |
| 25 | 0.06 | 95 | do | do | Very fine. |
| 26 | 0.2 | 80 | do | do | Do. |
| 27 | 0.4 | 70 | Semi-viscous | Less rapid | Do. |
| 28 | 0.8 | 80 | Viscous | Slow | Extremely fine. | about 25 to 4000 centipoises at 20° C. although that giving about 1500 centipoises viscosity is most preferred.

Among the various emulsifiers illustrated in Table VI for use in the invention, particularly suited are the non-ionic compounds—i. e. those substances which are not salts and subject to ionization when dissolved in water. The non-ionic synthetic emulsifiers enable production of granular polyvinyl chloride having superior electrical insulating properties as compared to polymer obtained by use of ionic emulsifiers such as sodium or ammonium salts for example.

This fact is made more evident for the results obtained upon measuring the volume electrical resistivity of plasticized polyvinyl chloride produced by use of the sodium salt of dioctyl sulfosuccinate and that with polyethylene glycol ether of sorbitan monopalmitate. Fine-grained polyvinyl chloride was obtained by heating at 50° C. with agitation in a closed vessel for 14.5 hours vinyl chloride containing 0.2% lauroyl peroxide with 250% by weight of water to which had been added 0.04% of the sodium salt of dioctyl sulfosuccinate and 0.06% of methyl cellulose. The other granular polyvinyl chloride was produced by polymerizing vinyl chloride at 50° C. for 18 hours, the reaction mixture containing 0.3% lauroyl peroxide and 240% by weight of water based on the liquid vinyl chloride as well as 0.04% of polyethylene glycol ether of sorbitan monopalmitate and 0.06% of methyl cellulose. Each mixture was degassed upon termination of the polymerization and the mixtures were filtered to obtain the granular polyvinyl chloride. The polymer was then washed three times with acetone. Each of the polymers gave a sheet which was free of fish-eyes when plasticized as described hereinbefore. To test the electrical properties, each of the polymers was plasticized with 50% by weight of dioctyl phthalate and 2% of stabilizer consisting of a combination of lead silicate and silica gel. The compositions were formed by milling for 5 minutes at 140° C. and molding into a sheet for 2 minutes at 160° C. The volume resistivities of the plasticized polymers were then measured at 25° C. using a potential of 500 volts direct current. The results are given in Table VII wherein it will be noted that the volume resistivity of the polyvinyl chloride made using the non-ionic emulsifier is much superior to that produced by use of the sodium salt as emulsifier. The resistivity of the polymer composition from polyvinyl chloride produced with the non-ionic emulsifier is very high so as to be an excellent electrical insulator. Glass has a volume resistivity of about $90 \times 10^{12}$ ohm cm.

Table VII

| Example No. | Emulsifier | Volume Resistivity |
|---|---|---|
| | | Ohm cm. |
| 45 | Sodium salt of dioctyl sulfosuccinate | $53 \times 10^{12}$ |
| 46 | Polyethylene glycol ether of sorbitan monopalmitate. | $1,100 \times 10^{12}$ |

Well suited as non-ionic water-soluble synthetic emulsifying agents for use in the process are esters of polyhydric alcohols and saturated or unsaturated fatty acids of 12 to 18 carbon atoms, which esters have less than a majority of the hydroxyl groups of the polyhydric alcohol esterified or acylated. These include the fatty acid esters of an inner ether of hexitol, especially those monoesters of saturated or unsaturated fatty acids of 12 to 18 carbon atoms such as sorbitan or mannitan monolaurate, monopalmitate, monostearate, monooleate, or the monoesters of coconut oil fatty acids and like products described in U. S. 2,322,820. Also useful as non-ionic emulsifiers are the polyalkylene glycol ethers of esters such as are prepared by reacting an olefin oxide like ethylene oxide with the fatty acid ester of an inner ether of hexitol in the manner described in U. S. 2,380,166. Specific emulsifiers of this class include the polyethylene glycol ethers of sorbitan or mannitan monolaurate, monopalmitate, monooleate or monostearate. Another group of the preferred non-ionic emulsifiers consist of pentaerythritol or polypentaerythritol monolaurate, monostearate or monooleate.

The process of the invention may be executed in any suitable manner. The process is not limited to being conducted in any particular apparatus, but for large scale commercial manufacture of the new and improved granular polyvinyl chloride of the invention, it is preferred to effect the polymerization in autoclaves fitted with stirrers. If a vapor space is used in the reaction vessel, best results are obtained with a substantially oxygen-free atmosphere over the stirred reaction contents such as is attained with vinyl chloride vapor. The pressure employed will vary with the operating temperature, but in any event is sufficient to keep the vinyl chloride in liquid phase while dispersed in the aqueous reaction medium. The polymerization reaction may be continued until substantially complete, i. e., until about 80% to 90% of the vinyl chloride is converted to polymer. While the formed granules of polyvinyl chloride will settle in the aqueous medium on cessation of agitation, the suspension is easily pumped as a slurry for the operation of filtration or centrifugation used to separate the polymer from the aqueous medium. The recovered granules of polymer are washed with water or dilute base to remove foreign matter. The washed polymer is dried by gentle heating.

For the purpose of illustrating execution of the invention in the preferred manner, the following example is given.

*Example 47*

A large glass-lined autoclave fitted with a stirrer and a water-cooled condenser was used as the reactor. The air was purged from the reactor and there was introduced liquid vinyl chloride and 0.3% of lauroyl peroxide along with 250% of water to which had been added 0.04% of the sodium salt of dioctyl sulfosuccinate and 0.06% of 1500 centipoise grade of cellulose methyl ether. The contents were agitated with the stirrer at 50° C. for 14½ hours whereby 81% of the vinyl chloride was polymerized. The pH of the reaction mixture decreased from about 7 at the start to about 4.5 at the end. The resulting suspension of polymer contained uniform, fine sized granules of polyvinyl chloride, 76% passing a 60 mesh screen and 33% passing a 100 mesh screen. The granular polyvinyl chloride was filtered from the aqueous medium. The granules were washed once with water, then with dilute sodium carbonate, and three times again with water after which they were dried in an atmosphere of air at about 60° C. The polymer had a molecular weight of about 97,000. When mixed with 50% of dioctyl phthalate and 2% of glycerol monooleate by milling for 5 minutes on a roll mill at 140° C. and then molding under pressure for 2 minutes at 160° C., a transparent sheet was obtained which was entirely free of fish-eyes.

*Example 48*

Vinyl chloride was polymerized in a reactor like that described in Example 47 using two non-ionic emulsifiers in combination along with the stabilizing colloid. The starting mixture consisted of liquid vinyl chloride with 250% by weight of water to which mixture had been added 0.3% of lauroyl peroxide based on the weight of vinyl chloride as well as 0.08% of cellulose methyl ether (1500 cps.) and 0.08% of equal quantities of sorbitan monostearate and polyethylene glycol ether of sorbitan monostearate, the last two percentages being based upon the weight of water. The polymerization was effected at 50° C. during a period of 15 hours whereby 84% of the vinyl chloride was converted to fine granules which were filtered. The sheet of polymer plasticized as described in Example 47 contained 10 fish-eyes per cc. The molecular weight of the polymer was 98,000.

We claim as our invention:

1. A process for production of granular polyvinyl chloride in aqueous dispersion wherein the formed polymer voluntarily settles upon the aqueous mixture becoming quiescent which comprises agitating and polymerizing dispersed liquid vinyl chloride in an aqueous medium at a temperature of 30° C. to 60° C., the reaction mixture containing 0.1% to 3% of oil-soluble peroxide polymerization catalyst and 200% to 500% of water, each percentage being based on the weight of the vinyl chloride, as well as 0.01% to 0.09% of water-soluble synthetic emulsifying agent and 0.01% to 0.3% of water-soluble stabilizing hydrophilic colloid, which latter percentages are based on the weight of the water.

2. A process for production of granular polyvinyl chloride in aqueous dispersion wherein the formed polymer voluntarily settles upon the aqueous mixture becoming quiescent which comprises agitating and polymerizing dispersed liquid vinyl chloride in an aqueous medium at a temperature of 30° C. to 60° C., the reaction mixture containing 0.1% to 3% of oil-soluble peroxide polymerization catalyst and 200% to 500% of water, each percentage being based on the weight of the vinyl chloride, as well as 0.01% to 0.09% of the sodium salt of dioctyl sulfosuccinate and 0.01% to 0.3% of cellulose methyl ether, which latter percentages are based on the weight of the water, said cellulose methyl ether giving a 2% aqueous solution having a viscosity of about 25 to 4000 centipoises at 20° C.

3. A process for production of granular polyvinyl chloride in aqueous dispersion wherein the formed polymer voluntarily settles upon the aqueous mixture becoming quiescent which comprises agitating and polymerizing dispersed liquid vinyl chloride in an aqueous medium at a temperature of 45° C. to 50° C., the reaction mixture containing about 0.3% to 0.5% lauroyl peroxide and about 250% of water, each percentage being based on the weight of the vinyl chloride, as well as about 0.04% of the sodium salt of dioctyl sulfosuccinate and about 0.06% of cellulose methyl ether, which latter percentages are based on the weight of the water, said cellulose methyl ether giving a 2% aqueous solution having a viscosity of about 1500 centipoises at 20° C.

4. A process for production of granular polyvinyl chloride in aqueous dispersion wherein the formed polymer voluntarily settles upon the aqueous mixture becoming quiescent which comprises agitating and polymerizing dispersed liquid vinyl chloride in an aqueous medium at a temperature of 30° C. to 60° C., the reaction mixture containing 0.1% to 3% of oil-soluble peroxide polymerization catalyst and 200% to 500% of water, each percentage being based on the weight of the vinyl chloride, as well as 0.01% to 0.09% of a sorbitan monoester of a fatty acid of 12 to 18 carbon atoms and 0.01% to 0.3% of water-soluble cellulose methyl ether, which latter percentages are based on the weight of the water.

5. A process for production of granular polyvinyl chloride in aqueous dispersion wherein the formed polymer voluntarily settles upon the aqueous mixture becoming quiescent which comprises agitating and polymerizing dispersed liquid vinyl chloride in an aqueous medium at a temperature of 30° C. to 60° C., the reaction mixture containing 0.1% to 3% of oil-soluble peroxide polymerization catalyst and 200% to 500% of water, each percentage being based on the weight of the vinyl chloride, as well as 0.01% to 0.09% of polyethylene glycol ether of a sorbitan monoester of a fatty acid of 12 to 18 carbon atoms and 0.01% to 0.3% of water-soluble cellulose methyl ether, which latter percentages are based on the weight of the water.

FRED E. CONDO.
CARL W. SCHROEDER.

REFERENCES CITED

The following references are of record in the file of this patent:

UNITED STATES PATENTS

| Number | Name | Date |
| --- | --- | --- |
| 2,133,257 | Strain | Oct. 11, 1938 |
| 2,194,354 | Crawford | Mar. 19, 1940 |
| 2,279,436 | Berg | Apr. 14, 1942 |
| 2,356,925 | Fryling | Aug. 29, 1944 |
| 2,388,601 | Collins | Nov. 6, 1945 |
| 2,419,347 | Folt | Apr. 22, 1947 |
| 2,473,929 | Wilson | June 21, 1949 |

FOREIGN PATENTS

| Number | Country | Date |
| --- | --- | --- |
| 437,446 | Great Britain | Oct. 28, 1935 |